United States Patent
Agarwal et al.

(10) Patent No.: US 12,506,701 B2
(45) Date of Patent: *Dec. 23, 2025

(54) SYSTEM AND METHOD FOR AUTOMATICALLY TRANSITIONING BETWEEN CARRIER AND IP MESSAGING

(71) Applicant: Twilio Inc., San Francisco, CA (US)

(72) Inventors: Amit Agarwal, Sunnyvale, CA (US); Peter Tan, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/650,048

(22) Filed: Apr. 29, 2024

(65) Prior Publication Data

US 2024/0283768 A1    Aug. 22, 2024

Related U.S. Application Data

(63) Continuation of application No. 17/454,409, filed on Nov. 10, 2021, now Pat. No. 11,973,737.

(60) Provisional application No. 63/112,293, filed on Nov. 11, 2020.

(51) Int. Cl.
*H04L 51/56* (2022.01)
*H04L 51/046* (2022.01)
*H04W 4/14* (2009.01)

(52) U.S. Cl.
CPC ............ *H04L 51/56* (2022.05); *H04L 51/046* (2013.01); *H04W 4/14* (2013.01)

(58) Field of Classification Search
CPC ..... H04L 51/56; H04L 51/046; H04L 51/066; H04W 4/14; H04W 4/80
See application file for complete search history.

(56) References Cited

U.S. PATENT DOCUMENTS

| | | | |
|---|---|---|---|
| 8,401,576 B2 | 3/2013 | Merrett | |
| 8,483,729 B2 | 7/2013 | Knotts | |
| 8,559,408 B2 | 10/2013 | Rice et al. | |
| 10,454,856 B2 | 10/2019 | Tao et al. | |
| 11,425,541 B2 | 8/2022 | Merrett | |
| 11,683,668 B2* | 6/2023 | Özümüztoprak et al. | H04L 51/58 455/466 |
| 11,736,430 B2* | 8/2023 | Tran | G06Q 10/00 709/206 |
| 12,143,900 B2* | 11/2024 | Kakumanu | H04L 51/234 |
| 2006/0077941 A1 | 4/2006 | Alagappan et al. | |
| 2006/0153194 A1 | 7/2006 | Kim | |
| 2008/0155029 A1 | 6/2008 | Helbling et al. | |
| 2009/0125595 A1 | 5/2009 | Maes | |

(Continued)

FOREIGN PATENT DOCUMENTS

| | | |
|---|---|---|
| DE | 202015006555 U1 | 11/2015 |
| EP | 2120407 A1 | 11/2009 |

*Primary Examiner* — Benjamin M Thieu
(74) *Attorney, Agent, or Firm* — Lowenstein Sandler LLP

(57) ABSTRACT

A system and method for automatically transitioning between carrier and IP messaging that can include receiving a messaging request specifying a destination endpoint for a message, retrieving client status of the destination endpoint from a client application registry system, evaluating the client status of the destination endpoint for use of a client application, and depending on whether the client status is being active or inactive, transmitting the message either to the destination endpoint or the client application associated with the destination endpoint.

20 Claims, 10 Drawing Sheets

(56) References Cited

U.S. PATENT DOCUMENTS

| | | |
|---|---|---|
| 2010/0105358 A1 | 4/2010 | Imashimizu et al. |
| 2010/0235453 A1 | 9/2010 | Attanasio et al. |
| 2011/0014933 A1 | 1/2011 | Karmarkar et al. |
| 2012/0023185 A1 | 1/2012 | Holden et al. |
| 2013/0060871 A1 | 3/2013 | Downes et al. |
| 2014/0281831 A1 | 9/2014 | Polehn et al. |
| 2017/0359689 A1 | 12/2017 | Chhabra et al. |
| 2019/0089825 A1* | 3/2019 | Scott ................. H04M 3/53391 |
| 2019/0245947 A1 | 8/2019 | Ishii |
| 2021/0224870 A1 | 7/2021 | Doumar |

* cited by examiner

SYSTEM AND METHOD FOR AUTOMATICALLY TRANSITIONING BETWEEN CARRIER AND IP MESSAGING

CROSS-REFERENCE TO RELATED APPLICATIONS

This application is a continuation application of co-pending U.S. patent application Ser. No. 17/454,409, filed Nov. 10, 2021, which claims the benefit of U.S. Provisional Application No. 63/112,293, filed Nov. 11, 2020, each of which is incorporated herein by reference.

TECHNICAL FIELD

An embodiment of the present subject matter relates generally to messaging communication and, more specifically, to a system and method for automatically transitioning between carrier and IP messaging.

BACKGROUND

SMS (Short Message Service) and MMS (Multimedia Messaging Service) have had wide adoption as ways of sending messages over a cellular network and continue to see increased use as communication channels for connecting to individuals. In particular, businesses have increased their use of communicating through telecommunication carriers and operator-provided messaging services like SMS, MMS, and/or RCS (Rich Communication Services) as a way of connecting to their users. SMS and MMS however have many issues. First, the use of SMS and MMS is accompanied with a financial cost that can be higher than other digital communication channels. Second, SMS and MMS can have reliability issues especially when used at high volumes and across different geographic regions. Thus, there is a need in the message communication field to create new and useful systems and methods to address such issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
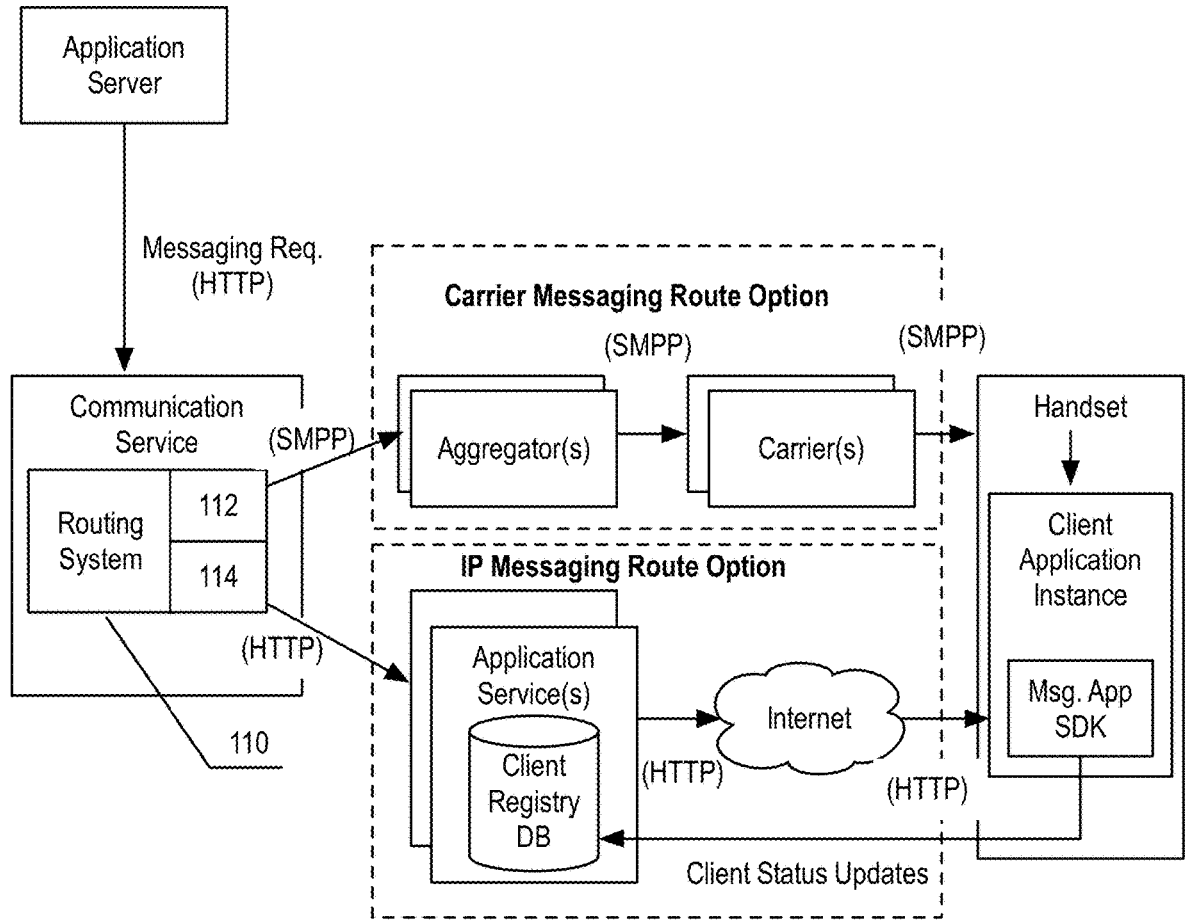
FIG. 1 is a system configuration, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for automatically transitioning between carrier-based messaging (e.g., SMS/MMS protocols) and IP-based messaging for enabled client messaging applications.

Systems and methods for automatic transitioning between use of internet protocol (IP) messaging and carrier messaging protocols function to automatically use IP messaging for selective messaging through telecommunication carrier/operator provided messaging services like short message service (SMS), multimedia messaging service (MMS), and/or rich communication services (RCS) depending on feasibility and conditions for a particular recipient.

These systems and methods may be employed in scenarios where a messaging or communication service coordinates with one or more phone providers and/or messaging application operators, so that the users of their telecommunication messaging application (e.g., used for SMS, MMS, RCS and/or other carrier-based messaging) can have messages selectively communicated using IP communication instead of using a carrier protocol like those used for SMS or MMS. These systems and methods can use coordinated management of a record of users with active client applications and then dynamically use different communication protocols based on those records.

The messaging or communication service could be any suitable entity such as a software as a service (SaaS) communication platform, a cellular telephone carrier offering alternative communication features, and/or any suitable entity. The messaging or communication service can manage the selective routing between carrier-based communications and IP-based communications. Herein, the messaging or communication service will be referred more concisely as a communication service.

These systems and methods may operate by dynamically determining the communication protocol used to deliver messages to a destination endpoint of a messaging application of an end user. The providers of the messaging application may be a mobile phone maker, a mobile operating system (OS) provider, a messaging application provider, and/or any suitable entity. In some situations, one of the providers of the messaging application may include the SaaS operator of the communication service.

Instances of messaging applications can be configured or customized to be reachable communication endpoints of these systems and methods. The messaging application may function, at least in part, as an SMS, MMS, and/or RCS messaging application, these systems and methods can expand the ways in which messages are communicated with the messaging application. The messaging application may additionally function as an IP-based messaging client application. Alternatively, an end user may have two or more messaging applications where carrier-based communication may be used for a first application and IP-based communication may be used for a second application.

In one example, a mobile operating system may include a standard SMS/MMS/RCS messaging application augmented with an alternative communication interface that expands the communication protocols by which messages can be received and/or transmitted. In this way the default messaging application of the mobile operating system can dynamically use SMS/MMS/RCS or IP-based messaging. In some exemplary embodiments, the messaging application may expose information indicating the communication channel being used. For example, messages sent over SMS/MMS/RCS may be presented within a user interface (UI) in a first color, and messages sent over IP may be presented as a different second color. In alternative exemplary embodiments, the messaging application may present messages the same regardless of the communication protocol.

These systems and methods may be particularly useful for application-to-peer (A2P) communications where outbound messages are initiated within a computing system. In one variation, outbound messages may be initiated programmatically using an API (Application Programming Interface) or other programmatic mechanism. In another variation, outbound messages may be automatically initiated within a computer system as a result of some configured logic. A2P communications may be used for large messaging campaigns or for applications where there will be a large volume of messages sent for the purpose of servicing an application's customers. A2P communications could additionally or alternatively be used for transactional messages where messages are individually initiated for communicating to one or a small group of recipients.

These systems and methods may additionally or alternatively be used for peer-to-peer communications where communications are initiated and originated from another communication destination (e.g., phone number of a phone). In such variations, messages could be received through a carrier-based communication or IP-based communication, and then depending on the client status of intended message destinations (e.g., the specified recipients), messages can be communicated using carrier-based communication or IP-based communication.

These systems and methods may provide a number of potential benefits. These systems and methods are not limited to always providing such benefits and are presented only as exemplary representations for how the systems and methods may be put to use. The list of benefits is not intended to be exhaustive and other benefits may additionally or alternatively exist.

As one potential benefit, these systems and methods can enable a communication network capable of increased reliability. Communicating over carrier networks is accompanied by many factors of unreliability. For example, depending on the carrier route used to send a message, standard carrier-based communications may or may not arrive. Additionally, communications over carrier networks can be accompanied by various character limits, filtering rules, geographic restrictions, messaging rate limits, varying costs, and/or other restraints, these systems and methods can enable dynamic use of IP messaging when a recipient has an actively registered client application. In this way, these systems and methods can enable IP-based communications for suitable destination endpoints, which functions to improve reliability for at least that segment of recipients.

As a related benefit, these systems and methods can reduce the cost of communicating by using more cost-efficient communication options like IP messaging when available.

As another benefit, these systems and methods can enable messaging in locations without telecommunication service if internet access is available. For example, messages can still be delivered and/or received when a user is in a location with bad cellular reception like in a remote area or inside a building with poor reception. These systems and methods can in a similar manner improve reachability by dynamically using carrier-based communications if IP-based communication may be determined to be less effective in delivering a destination.

As another potential benefit, these systems and methods can enable dynamic IP delivery of messages across a variety of different messaging applications. It can be costly and complicated to deploy and coordinate IP message delivery for many messaging applications or phone providers. These systems and methods may, in some variations, enable interoperability across different types of messaging applications, thereby expanding the opportunities for using IP-based communications. For example, multiple different types of messaging applications (e.g., offered by different operators) could interface with these systems and methods for enhanced messaging across multiple messaging applications.

As another potential benefit, these systems and methods may enable improved tracking and analytics on the messaging options used. This may be used for various metric based messaging campaigns. For example, the cost of messaging across a large number of recipients could be predicted and possibly customized based on the reachability over carrier-based communications and IP-based communications.

As another potential benefit, these systems and methods may enable more consistent and reliable use of messaging features as well as expanding the feature set beyond what is available over carrier-based messaging. For example, these systems and methods may enable features such as delivery receipts, read receipts, typing indicators, participant logos/avatars, call to actions features within a message, and the like. These systems and methods may additionally further expand capabilities for rolling out new messaging features such as those supported by emerging protocols like those specified in the Rich Communication Services (RCS) protocol.

As shown in FIG. 1, a system for automatic transitioning between use of internet protocol (IP) messaging and carrier messaging protocols can include a routing system 110 that includes a carrier message routing system 112 and a client message routing system 114, and further including a client application registry system 120. The system can interface with one or more types of client applications.

The system may be implemented as part of a communication service that interfaces with or is part of a carrier communication network. In one variation, the communication service can include messaging route interfaces to one or more carrier networks, where the messaging route interfaces may be used for initiating transmission of a carrier-based message like an SMS or MMS message. The communication service can also include one or more communication endpoints registered for use by the communication service. Communication endpoints can include phone numbers, short codes, long codes, and/or any suitable endpoint address. In one variation, communication endpoints registered and managed by the communication service can be used to send outgoing communications from those communication endpoints. For example, messages sent to a recipient phone number using SMS or MMS can be sent with an origin phone number endpoint of one of the communication endpoints registered and managed by the communication service. In another variation, a communication endpoint registered and managed by the communication service may be the recipient of an inbound communication. Inbound communications may be appropriately routed to a recipient device and/or otherwise communicated to the specified endpoint.

In one variation, the communication service is a SaaS computing platform, which may facilitate messaging and/or other services. The communication service can interface with one or more carrier communication network. The communication service may alternatively interface with another external system that directly or indirectly interfaces with a carrier communication network.

In another variation, the communication service is part of a carrier communication network. In other words, an operator of a cellular network can implement the communication service with direct integration into the cellular network.

The routing system 110 functions to coordinate the selection of a communication protocol and the communication of a message using a selected communication protocol. The routing system 110 can include one or more computer processors; and one or more computer-readable mediums (e.g., non-transient computer-readable mediums) storing instructions that, when executed by the one or more computer processors, cause the communication service system to perform operations comprising: in response to receiving a messaging request directed to at least one destination endpoint, retrieving client status of the destination endpoint from the client application registration database; evaluating the client status for use of a client application destination; in response to the destination endpoint having an inactive client status, transmitting content of the messaging request to the destination endpoint; and in response to the destination endpoint having an active client status, transmitting content of the messaging request to a client application endpoint mapped to the destination point.

The routing system 110 can include a message input that takes in messaging requests where the messaging requests are processed by the routing system 110 to facilitate communication of messages based on the messaging requests.

A message request can include a set of properties that define properties of a message intended for communication to one or more destinations. The message request can include properties for message content, message origin (e.g., identifier of the sender of a message), message destination (e.g., identifier(s) of intended recipients of a message), and/or other properties.

Message destinations and/or message origin can be specified as phone numbers or other types of telephony endpoints. In some variations, message origin may be determined automatically based on the entity making the messaging request. For example, an origin endpoint associated with a user account of the communication service may be automatically used when the user account makes the messaging request.

Messaging requests may be individual messaging requests. For example, a message request may be associated with one message communicated with one destination.

Messaging requests may alternatively be group message requests where a message is communicated as a group message. Group messaging may alter the selection of communication protocols. For example, in some variations, all participants of a group message may be inspected for their client status and then IP-based communications can be used if all participants are accessible through IP-based communications. Alternatively, group messaging may be handled in other ways.

Messaging requests may alternatively be part of a bulk messaging request where message content is requested to be delivered individually to a plurality of different destinations. In this way a single bulk messaging request may be used in place of multiple individual messaging requests.

Messaging requests may be received and established through an application programming interface or other programmatic interfaces. Programmatic messaging requests can be made to perform A2P messaging where an application or other automated system initiates outbound messages.

An API of the communication service may be any suitable type of API such as a REST (Representational State Transfer) API, a GraphQL API, a SOAP (Simple Object Access Protocol) API, and/or any suitable type of API. In some variations, the communication service can expose through the API, a set of API resources which when addressed may be used for requesting different actions, inspecting state or data, and/or otherwise interacting with the communication service.

A REST API and/or another alternative type of API may work according to an application layer request and response model. An application layer request and response model may use HTTP (Hypertext Transfer Protocol), HTTPS (Hypertext Transfer Protocol Secure), SPDY, or any suitable application layer protocol. Herein HTTP-based protocol is described, but it should not be interpreted as being limited to the HTTP protocol. HTTP requests (or any suitable request communication) to the communication service may observe the principles of a RESTful design or the protocol of the type of API. RESTful is understood in this document to describe a Representational State Transfer architecture as is known in the art. The RESTful HTTP requests may be stateless, thus each message communicated contains all necessary information for processing the request and generating a response. The API service can include various resources, which act as endpoints that can act as a mechanism for specifying requested information or requesting particular actions. The resources can be expressed as URI's or resource paths. The RESTful API resources can additionally be responsive to different types of HTTP methods such as GET, Put, POST and/or DELETE requests.

Messaging requests may additionally or alternatively be received and established as a result of receiving inbound messages at the communication service. In such variations, an origin endpoint may send a message to one or more destination endpoints where one of the destination endpoints is managed by the communication service. In some variations, the inbound message may be transmitted and received through a carrier-based communication protocol. For example, a sender may send a message to a destination phone number as an SMS message; if the destination phone number is managed by the communication service, the communication service may receive an indication of that message; and then the communication service may facilitate forwarding that message to a corresponding receiving phone number or client application.

The carrier message routing system 112 functions to interface the communication service with one or more carrier-based communication routes. The communication service can include one or more carrier connections wherein messages may be sent to carrier-based endpoints. When the routing system 110 elects to send a communication using a carrier-based channel, the message is communicated to an appropriate carrier connection for routing to the destination endpoint. Carrier-based channels can use SMPP (Short Message Peer-to-Peer protocol) for communicating to an aggregator or another suitable gateway such that the SMS/MMS/RCS message is transferred over a carrier network. Once transmitted to the carrier network the message will generally be relayed appropriately to arrive at the intended destination.

A communication service may have multiple carrier routing interfaces where the different carrier routes can be selected and used based on various properties such as route quality, route cost, and other properties.

When the communication service is a carrier network or part of a carrier network, the carrier messaging routing system 112 can be the routing options within the carrier's network.

The client message routing system 114 functions to interface with one or more client application systems. The client message routing system 114 may use an alternative messaging protocol when compared to the carrier-based protocol. The client message routing system 114 may send the communication over IP using an IP communication protocol. The IP communication protocol can be distinct from the carrier-based communication protocols associated with message transmission of the carrier message routing system 112.

The client message routing system 114 may use a single standardized IP communication protocol for transmitting messages to one or more different types of client applications. The client message routing system 114 may alternatively use two or more IP communication protocols which are used based on the type of client application. For example, a first client application may use a first IP communication protocol and a second client application may use a second IP communication protocol.

The client application registry system 120 functions to maintain a data repository storing the status of at least the client application instances that may be accessible using an IP-based communication protocol. The client application registry system 120 may be managed in a variety of ways. In principle, the client-status of various destination endpoints can be stored and updated so that the routing system 110 can determine if and when a destination endpoint is reachable by client application using an IP-based communication protocol.

The client application registry system 120 may additionally manage data mapping one or more communication endpoints to a destination endpoint. For example, the client application registry system 120 may store IP-based addressing information for destination endpoints with a registered client application. In some instances, the destination endpoint used for carrier-based communications may be sufficient for addressing messages using an IP-based communication protocol.

The client application registry system 120 can use one client application registry or multiple registries. A client application registry can be a client application database system (e.g., a single database or set of databases). Similarly, different variations of the client application registry system 120 may use an internally hosted variation and/or one or more externally hosted variations. In an externally hosted variation, the client application registry system 120 can include an interface to an external client application registry.

Figure 2:
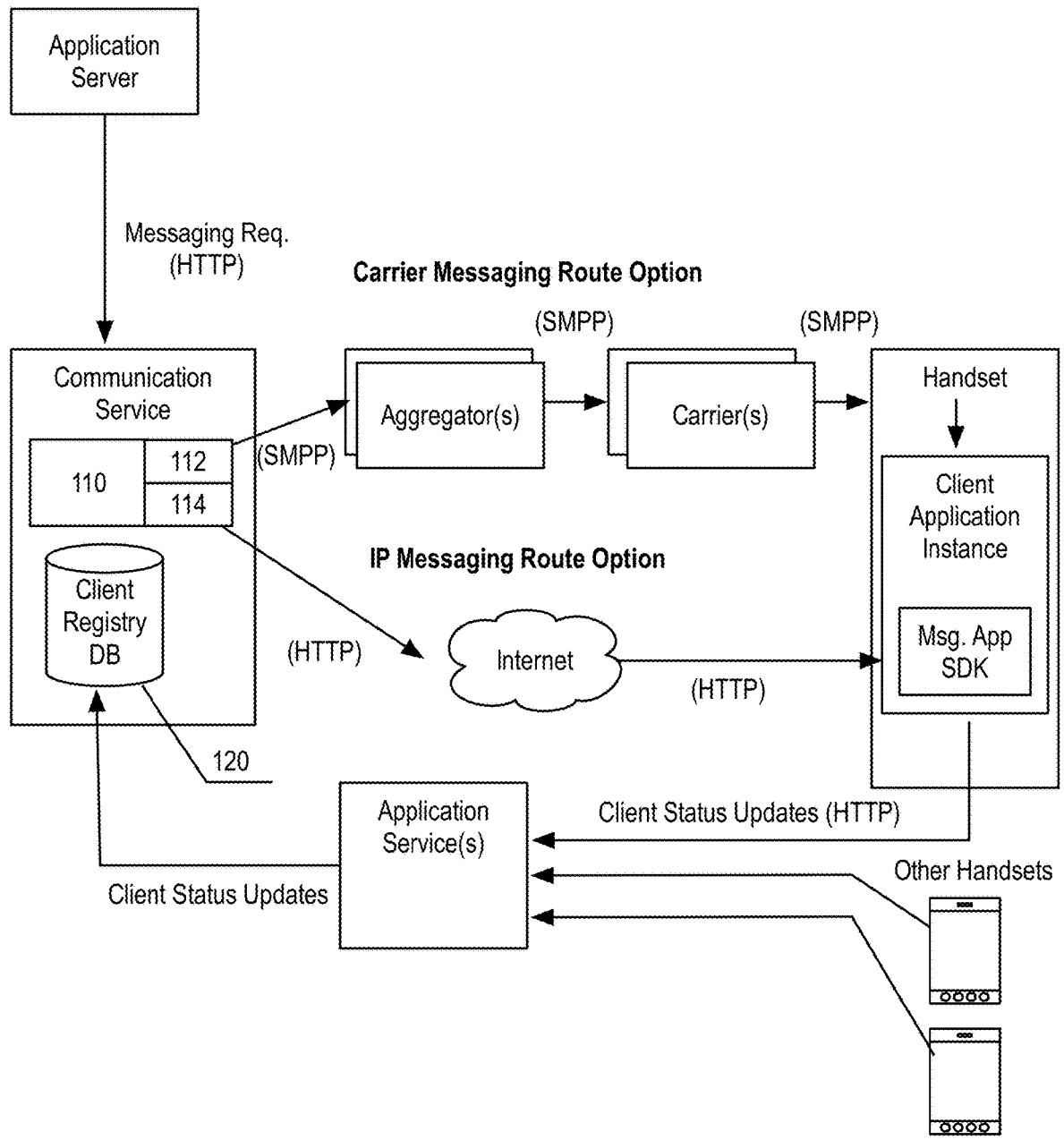
FIG. 2 is an alternative system configuration, according to some example embodiments.

In an internally hosted variation, external parties can update a centralized client application registry, which can be operated within the communication service such as shown in FIG. 2. In this variation, the client application registry may be hosted and/or managed by the communication service. The communication service can expose an application programming interface (API) to external partners so that client application registration records can be created and/or updated based on changing status of client application instances.

In an externally hosted variation, the communication service may include a registry interface that programmatically interfaces with one or more external client application registries as shown in FIG. 1. In one exemplary embodiment, externally hosted client application registries may be maintained by each operator of a messaging application. For example, each phone provider may maintain their own client application registry for their compatible phones/devices. A registry interface may use a commonly used API with substantially uniform interfaces exposed for querying and inspecting the status of the different client application registries. With an externally hosted client application, the communication service can query one or more of the client application registries to determine the client-status of different destination endpoints. The client application registry may include an indicator of if a destination endpoint has an associated client application. In one exemplary embodiment, the client application registry may store a mapping or data association between a destination endpoint and a client application indicator. This client application indicator can at least show that the destination endpoint may be reachable at a client application via IP-based communication. The client application indicator may be updated when a new user registers a new device or application for use with a communication endpoint. The operator of the client application may update the registration registry in response to such events. For example, when a new user sets up their phone number to be used with a new phone, then the operator of the messaging application on that phone can update the client application registry.

In some variations, the destination endpoint is mapped to a client application identifier which can be used for directly communicating a communication message. In this variation, the communication service can transmit a communication message to the appropriate application instance using the client application identifier.

In some variations, such as when the client application registration registry is externally hosted, the client application indicator indicates the client-status (e.g., not accessible via a client application, possibly accessible, or confidently accessible). The client application identifier may be kept private if the message is to be routed to the client application through the maintainer of the client application registry. For example, if a phone number is indicated to be reachable through a client application, the communication service can relay the communication message to the operator of the client application registry which can then manage delivery to the appropriate client application instance.

In some variations, a registry may include a status field used to record the current status of the client application. There could be many situations where a user may not be reliably reached at a client application after a communication endpoint was initially associated with the client application. The user may change devices, close/disable/uninstall an application, be reachable only by carrier network, and/or have other scenarios where the client application may not be the best option for reaching a user. Accordingly, the client application registry may additionally include records that can indicate the reachability of the client status.

In one exemplary embodiment, a last-use field may record the time and/or date of the application. The last-use field may be used so that consideration of a client application may expire if the user has not actively used the application in a certain amount of time (e.g., one day, one week, one month, etc.). This may reduce situations where messages are routed to an application when the user no longer uses that application or even that device. As another exemplary embodiment, the registration database may include an activity record so that communication interactions with a client application and optionally other reported status information from the external partner may be used for individually predicting usage status of an application.

The client application functions as the user-facing client through which communication can be received and transmitted. In one variation, the client application can be reachable through at least two communication channels: a carrier-based communication channel and an IP-based communication channel.

Depending on configuration of the client application, the routing of messages to and from the client application may be performed in part through the operating system, a communication framework, within the client application itself, and/or in any suitable manner.

In some variations, the client application may include an incorporated client service library, software development kit, framework, or other suitable type of code module that manages the dynamic communication. The code module and/or the client application may manage how communications are rendered. In one variation, a messaging app may transparently use SMS/MMS/RCS messaging and IP-based messaging such that the end user may be unable to tell how a message is used. In another variation, the messaging app may highlight the type of message. For example, messages may be colored or otherwise marked based on the mode of communication in which the message was received or transmitted. The code module and/or client application may additionally manage the integration and enabling of various enhanced features like read/delivery receipts, typing indicators, interaction tracking (e.g., link clicking), call to action features (e.g., user input collection, payment completion, etc.), and/or other features. The code module and/or the client application can additionally manage or assist in managing updating client status with the registration database.

The client service code module may be configured to initiate updating of a client application registry when the client application becomes associated with a destination endpoint as an IP-reachable messaging destination. The client service code module may additionally be configured to update activity usage of the client application. For example, usage of the client application may trigger updating activity data for a record in the client application registry so that activity and/or inactivity of a client application may be used to determine if IP-based communications or carrier-based communications are more suitable.

The client applications may additionally include configuration to provide message delivery feedback. Message delivery feedback could include logging receipt of a message, logging reading/interacting with a message, and/or other forms of feedback.

In some alternative variations, a client device of a user may receive carrier-based communications through a first application channel and receive IP-based communication through a second application channel, where the first application channel is different from the second application channel. For example, SMS and MMS messages may be handled by a default SMS/MMS messaging application of a phone, but messages transmitted over IP-based communication may be received through a different application.

Figure 3:
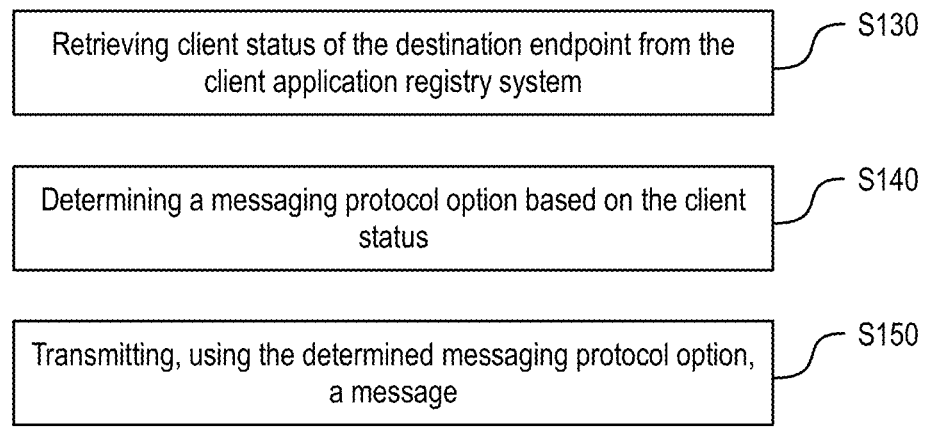
FIGS. 3-6 are flow diagrams methods of some example embodiments.

As shown in FIG. 3, a method for automatic transitioning between use of IP messaging and carrier messaging protocols can include in response to a messaging request, retrieving client status of the destination endpoint from the client application registry system S130; determining a messaging protocol option based on the client status S140; and transmitting, using the determined messaging protocol option, a message S150.

Figure 4:
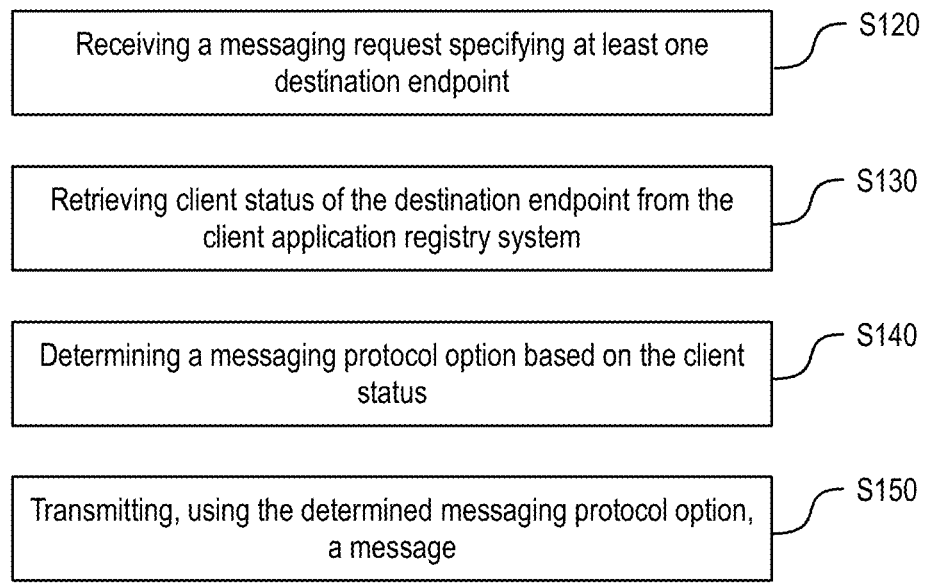

Alternative embodiments of the method can include receiving and processing a messaging request such that the method can include, as shown in FIG. 4: receiving a messaging request specifying at least one destination endpoint S120; retrieving client status of the destination endpoint from the client application registry system S130; determining a messaging protocol option based on the client status S140; and transmitting, using the determined messaging protocol option, a message S150.

Figure 5:
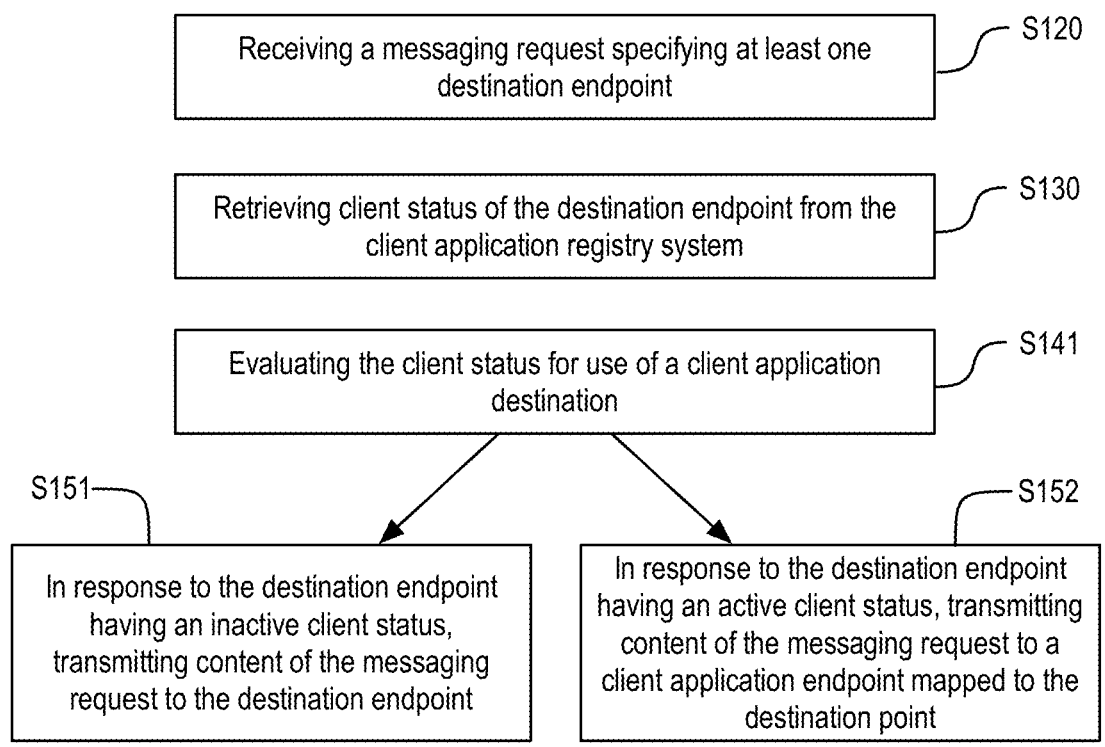

The method may function to dynamically select between at least a carrier-based messaging route option and an IP-based messaging route option. The dynamic selection may be based on the client status and/or result from evaluation of the client status. As shown in FIG. 5, an exemplary embodiment of the method can include: receiving a messaging request specifying at least one destination endpoint S120; retrieving client status of the destination endpoint from the client application registry system S130; evaluating the client status for use of a client application destination S141; in response to the destination endpoint having an inactive client status, transmitting content of the messaging request to the destination endpoint S151; in response to the destination endpoint having an active client status, transmitting content of the messaging request to a client application endpoint mapped to the destination point S152.

Figure 6:
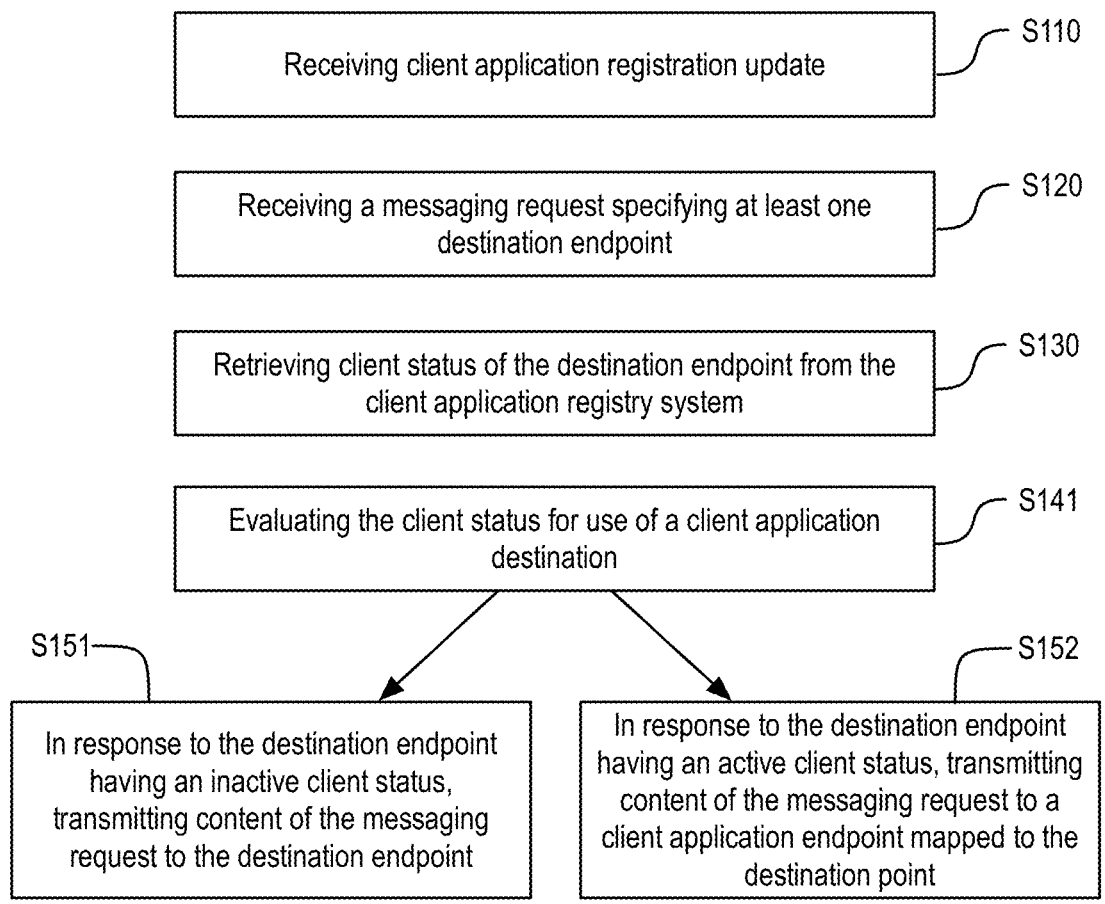

In some exemplary embodiments, the method may further include processes related to updating and maintaining a client application registry. Client applications and/or operators managing client applications may facilitate tracking client application status and appropriately updating one or more client application registry. Accordingly, in one exemplary embodiment, the method may include, as shown in FIG. 6: receiving client application registration update S110; receiving a messaging request specifying at least one destination endpoint S120; retrieving client status of the destination endpoint from the client application registry system S130; evaluating the client status for use of a client application destination S141; in response to the destination endpoint having an inactive client status, transmitting content of the messaging request to the destination endpoint S151; in response to the destination endpoint having an active client status, transmitting content of the messaging request to a client application endpoint mapped to the destination point S152.

Figure 7:
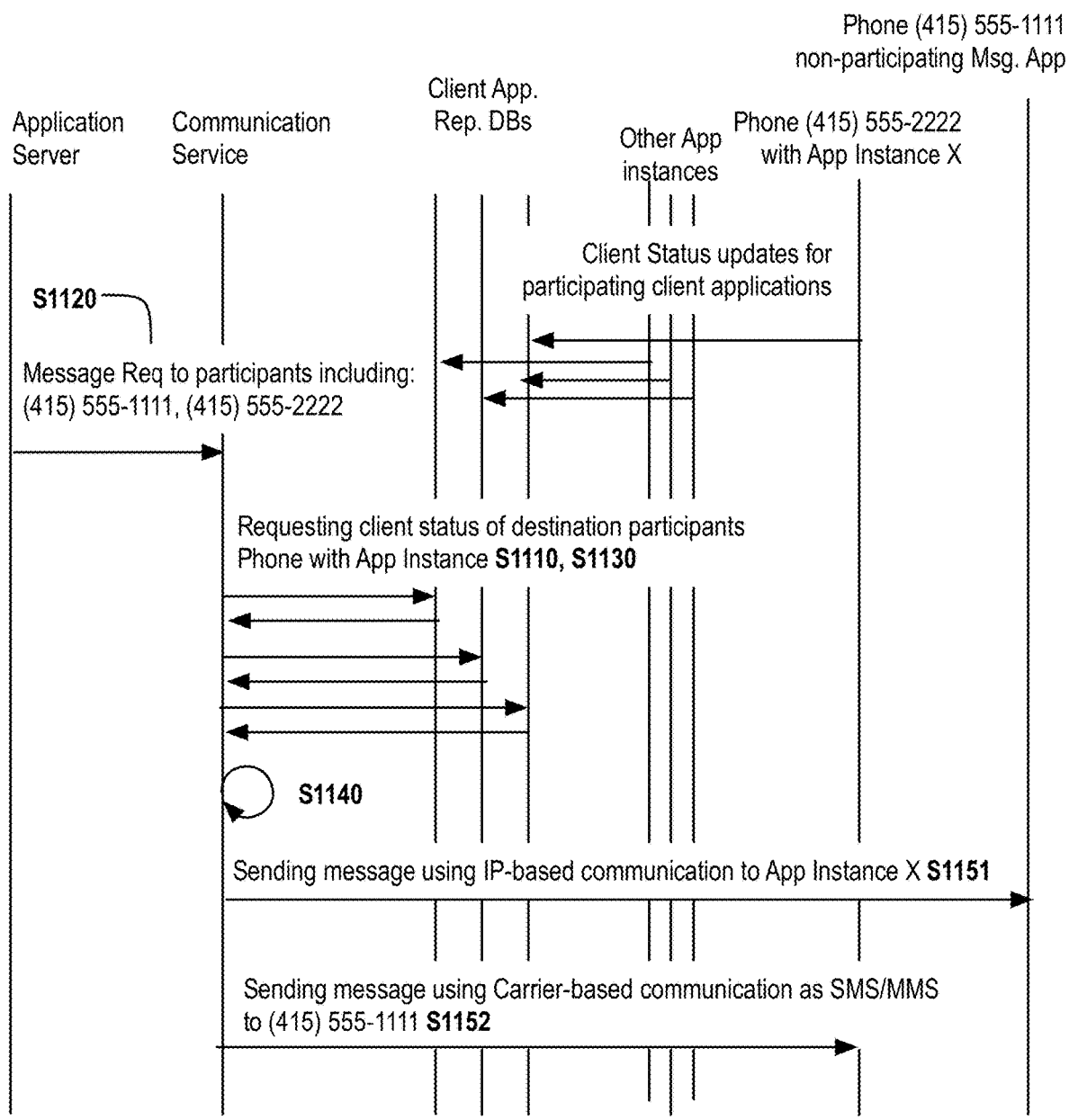
FIG. 7 is a communication flow diagram of a variation using external client registration databases.

The method may be implemented in a variety of ways. In one variation, the method may be implemented where a communication service interfaces with one or more externally managed client application registries. As shown in an exemplary embodiment of FIG. 7, the method can include receiving a messaging request directed to at least one destination endpoint S1120; interfacing with multiple client application registries that are updated with client application status updates S1110; requesting client status of the destination endpoint from the multiple client application registries S1130; evaluating the client status for use of a client application destination S1140; in response to the destination endpoint having an inactive client status, transmitting content of the messaging request to the destination endpoint S1151; in response to the destination endpoint having an active client status, transmitting content of the messaging request to a client application endpoint mapped to the destination point S1152.

When interfacing with a plurality of client application registries, the method may include identifying a client status from one client application registry of the plurality of client application registries. In some instances, different client application registries may correspond to distinct client applications which may or may not have specific IP messaging protocols. Accordingly, transmitting content of a messaging request to a client application endpoint can include using the IP-based messaging protocol corresponding to the client application type, which may be based on the client application registry from which the client status was identified. The plurality of client application registries may include internally maintained client application registries and/or externally maintained client application registries. In alternative embodiments a single internal or external client application registry may be maintained for multiple different client application types.

Support for use of multiple client application registries can enable multiple entities to independently maintain and manage distinct client application registries. The distinct client application registries could be privately maintained by the maintainer of the client application registry. For example, a cellular network service could maintain a client application registry for all subscribers of their network. In another example, providers of a mobile device (e.g., the phone manufacturer and/or operating system provider) could maintain a client application registry. The different client application types may have distinct features, use distinct IP-based messaging protocols, and/or have other differences.

A destination endpoint may correspond to multiple different client status records. This may occur when a destination endpoint is associated with multiple client application instances, which could result from their being, for example: multiple client application instances on different devices, multiple installs of the same client application, and/or different types of client applications. The method could facilitate determining at least one client application for communication when multiple client applications are active for a given destination endpoint. Depending on configuration and preference, the most recent or frequently used client application may be selected based on the different client statuses in the client application registry system.

Figure 8:
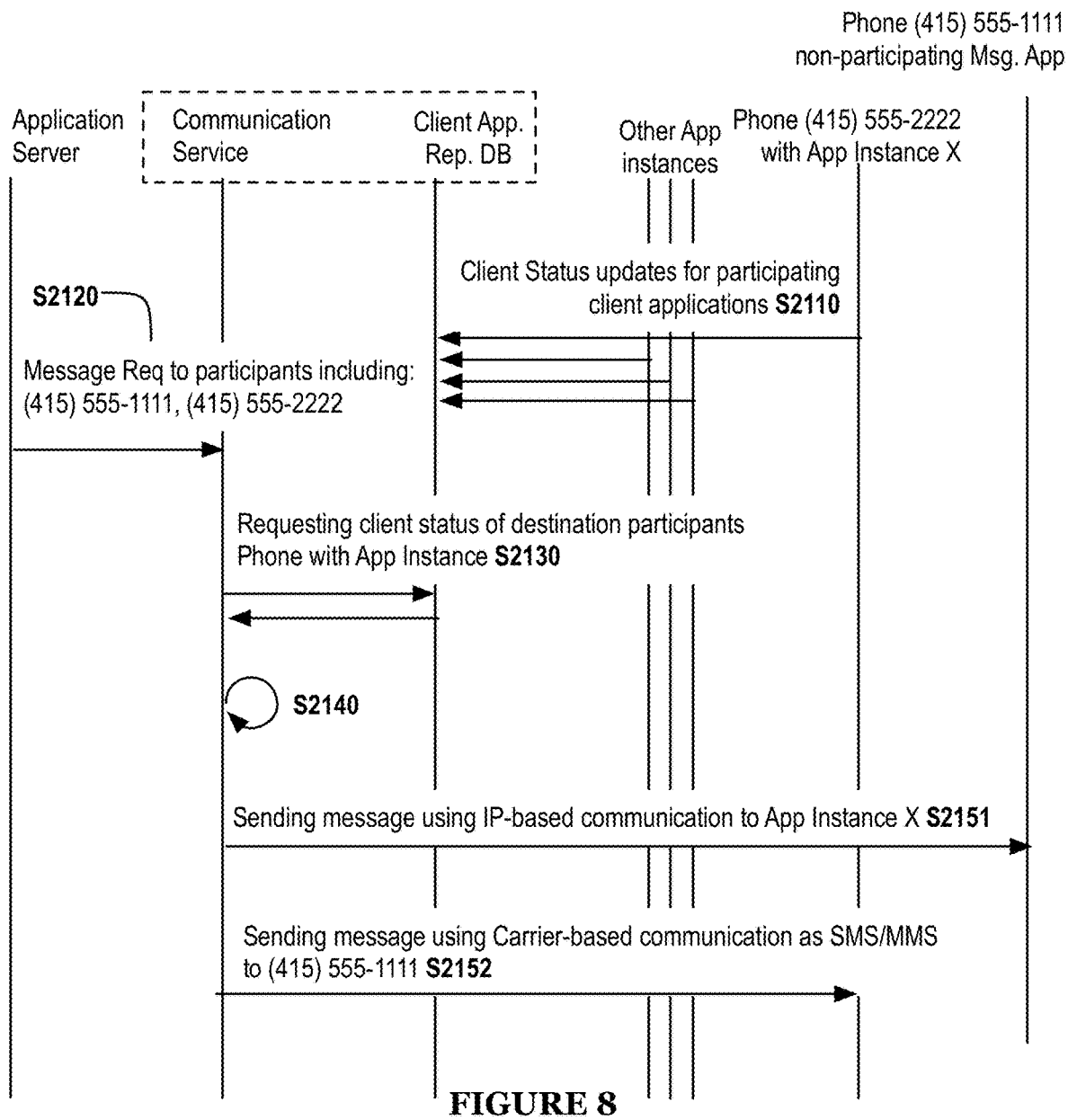
FIG. 8 is a communication flow diagram of a variation using an internal client registration database.

The method may alternatively be implemented where the client application registry system is maintained within a communication service based on received updates from one or more operators of client applications or from the client applications directly. As shown in an exemplary embodiment of the method in FIG. 8, the method can include receiving client application registration updates and updating the client status of destination endpoints within a client application registry system S2110; receiving a messaging request directed to at least one destination endpoint S2120; retrieving client status of the destination endpoint from the client application registry system S2130; evaluating the client status for use of a client application destination S2140; in response to the destination endpoint having an inactive client status, transmitting content of the messaging request to the destination endpoint S2151; in response to the destination endpoint having an active client status, transmitting content of the messaging request to a client application endpoint mapped to the destination point S2152.

In such an exemplary embodiment, the client application registry may be a unified registry used for one or more different types of applications. In another variation an internal client application registry may be used in combination with an external client application registry.

The method can be used for transmission of messages resulting from different types of messaging requests.

The method request may originate from a programmatically initiated request (e.g., initiated via an API or triggered from some event within a computing system), such that the message functions as application-to-person (A2P) messaging. For example, a received messaging request may be used to initiate outbound messages using a selected communication endpoint to represent the origin endpoint.

The method request may alternatively be part of a message forwarding configuration for a received inbound message. This message processing in response to an inbound message can be used to facilitate person-to-person (P2P) messaging with one or more legs of the messaging dynamically selecting a message protocol option. For example, a message received by a communication service can be automatically forwarded to a determined destination endpoint using carrier-based communication channel or an IP-based communication channel. When implemented by a carrier network, the method may be used so that received SMS messages may be dynamically transformed to IP messages for the receiving party.

The relationship of the sender and the recipient(s) may also vary depending on the type of message.

The message may be initiated as a single two-entity message. In one example, the method is used for sending a message to a single recipient from a message origin. This can serve as a transactional message for an A2P messaging scenario.

The message may alternatively be initiated as a bulk message request, where multiple distinct messages are communicated to different recipients based on a single request. This may be used in an A2P messaging scenario for a messaging campaign where multiple recipients are messaged with the same/similar message content.

In another example, the method may be used for sending a group message where more than two participants are part of a group message conversation. In one group message variation, the client status for each participant may be checked and a message protocol option may be selected that accommodates group messaging across the group. In one example, IP-based communication can be used if all participants have active client applications that can communicate using IP-based communication, and the group message may default to carrier-based communication if not all participants have active client applications. In an alternative variation, a subset of participants may use IP-based communication while a second subset of participants use carrier-based communications. For example, if a carrier network was implementing such a method, destination endpoints that are part of their carrier network may dynamically use IP-based communication or carrier-based communication independently from how other participants are messaged.

Block S110, which includes receiving client application registration update, functions to register and/or optionally change status of a client application associated with a destination endpoint. As discussed herein a client application registry system can maintain an association of destination endpoints (e.g., phone numbers or other carrier device identifiers) with one or more client application instances. The client application instance may be operable on the device associated with the destination endpoint (e.g., phone number). However, in some variations, a client application may be operable on a second device that is different from the device associated with the destination endpoint. As another variation, there may be multiple client applications on the same or different devices that are registered. Multiple client applications may be multiple instances of the same type of client application. For example, a user may have a first messaging client instance on a phone and a second messaging client instance on a tablet. Multiple client application may additionally or alternatively include different types of client applications. For example, a user may have a first and second type of client application installed on their phone. Depending on the configuration, all or a subset of the client application instances may be targeted for communication of messages when there are multiple client application instances registered for a destination endpoint.

Registration updates can be received for many different client application instances. In time, the method can operate where there can be a large number of client application instances registered for different destination endpoints.

Receiving client application registration update can include receiving a variety of different types of registration updates and then correspondingly updating a client application registry system. In one variation, the updates may be initiated and communicated by the operator(s) of the client application(s). For example, the provider and/or operator of the client application may receive updates from different client application instances via network communication between the client application instances and a server of the provider/operator. The provider/operator can then transmit appropriate registration updates to the client application registry system. In some alternative variations, the updates may be communicated directly from the client application instance. For example, a client application instance may include configuration to send registration updates regarding its client status to the client application registry system.

Registration updates may be submitted to establish a new association between a destination endpoint and a client application instance, remove association between a destination endpoint and a client application instance, provide usage updates, and/or provide other forms of updates.

Initially, a registration update for new client application instance adds a mapping between a communication endpoint and a client application. This may result from configuring pairing of a destination endpoint with a client application. This may occur within the client application and/or through other forms of configuration of the client application. In some instances, this pairing may be the enabling of IP-based communications and/or carrier-based communications for a client application. For example, when a user is setting up a new phone, the client application may default to having IP-based communication enabled or the user may select a configuration option to enable IP-based communication within the default carrier-based messaging application. In another option, the user may install a new messaging application and during setup of the new messaging application, the user can select an option to use their phone number for SMS/MMS carrier-based communications and use either their phone number or email for IP-based communications when possible.

In some cases, a registration update may be an update to an existing known mapping between a communication endpoint and a client application. In one variation, the update can update a last-use property of the client application instance. The update may update a list of usage records, which may be used in evaluating a history of usage. Other suitable metadata may also be stored and added to the information of a client application instance. In one example, a client application instance may periodically transmit a usage data that is used in submitting a registration update used to update the usage records associated with the client application.

In some cases, a registration update may be the canceling or deactivating of a client application instance. If, for example, an application instance is uninstalled or a phone number is transferred to a new device, then a request may be communicated to delete or otherwise deactivate the mapping to prevent future communications from being delivered to the application instance.

Typically, the updates to the client application registry system are made in response to reported updates from the client application and/or an operator/partner of the client application. In some variations there may be alternative modes of updating client application status. In one variation, data concerning the device type associated with a communication endpoint may be detected and if that device type matches a particular pattern or condition, then it may be determined to be associated with a client application instance. For example, if a particular model of phone is known to come by default with a built-in messaging application that has support for IP-based messaging, then determination of a phone number being paired with that phone model will indicate the phone has IP-based messaging support. Detecting a device type may be achieved in a variety of ways. In one example, the communication service may provide a link shortener service, and the method may include after sending a message with a link, detecting the device and client application type when the shortened link is accessed in a browser. In another variation, phone numbers that are part of a cellular network service may be automatically paired with an endpoint for IP-based communication.

In some variations, the registration update can supply a communication endpoint and other client application addressing information that can be used for IP-based communication. This IP-based communication endpoint can be the same or different from the destination endpoint. The IP-based communication endpoint could be a phone number, an email address, a private identifier, or any suitable address used for directing the IP-based communication. In some variations, the IP-based communication endpoint is explicitly provided as part of the registration update. In other variations, the IP-based communication endpoint may be inferred or automatically determined based on other information. For example, the IP-based communication endpoint may be the same or based on the destination endpoint or carrier-based communication endpoint (e.g., phone number).

Detection of the presence of a compatible client application may, in some instance, not supply the IP-based communication endpoint needed to perform IP-based communication, but it may enable the method to more effectively request addressing information from an appropriate source (e.g., the phone provider).

In some variations, the client application registry system is managed externally, and the method may be implemented by interfacing with this external client application registry system. As such, the method may alternatively be performed without maintaining a client application registry or receiving registration updates.

Block S120, which includes receiving a messaging request specifying at least one destination endpoint, functions to initiate the process of transmitting an outgoing message that is directed to at least one recipient. The messaging request can include a set of properties defining the message to be sent. The messaging request properties can include message content such as text, media (e.g., a photo, video, audio, etc.), and/or other suitable types of content. In some variations, the message content may be the same for carrier-based communications and IP-based communications. In some variations, the message content may be set so that at least two variants can be specified with one message content variation associated with messages that are transmitted using carrier-based communications and another message content variation associated with messages that are transmitted using IP-based communications.

The messaging request properties can specify at least one destination endpoint. The destination endpoint may be specified as a telephony/carrier-based endpoint like a phone number. In some instances, a phone number may be indirectly referenced by indicating an associated identifier in the request like a user identifier that may be paired to a phone number. The destination endpoint(s) may alternatively be indicated indirectly such as being specified by reference. For example, a messaging request may indicate a set of recipient properties, and the recipient properties are used for determining a set of contacts for sending of a bulk message. A messaging request may be directed at one or multiple destination endpoints.

The method may have applications in a wide variety of messaging scenarios. In one particular scenario, the messaging request is part of an A2P messaging request, where the message does not originate directly from an external communication device (e.g., phone) but is instead a result of a programmatic request. For example, some application service may make an API request to send a message to one or more phone numbers. In another scenario, the messaging request is received in the form of receiving an inbound communication from a communication device. For example, a telephony endpoint may send a message (e.g., via SMS/MMS/RCS) to a phone number managed by the communication service.

The messaging request properties may include other optional properties such as communication protocol selection properties. The messaging protocol selection properties may be used in evaluating client status and determining the messaging protocol option. In one variation, a messaging protocol selection property could have a price threshold such that is used for evaluating use of carrier-based communications dependent on price. In another variation, the messaging protocol selection property could have a usage/time threshold that is used as a threshold for how recent usage of the client application must have occurred.

The messaging request could include other properties that are used in determining a messaging protocol option and/or for how a message is sent. In one example, a read and/or delivery receipt option may be set to indicate if a read and/or delivery receipt is requested. Requesting a read and/or delivery receipt may be used in preferentially selecting an IP-based communication option when its available.

As another potential messaging request property, the messaging request may indicate fallback options if IP-based communications are not available. In some variations, the sending of a message may default to carrier-based communications if IP-based communication is not available for a destination. However, some variations may enable, canceling or otherwise aborting sending of a message if IP-based communications are not available for a particular destination.

As another potential messaging request property, the messaging request could include client application priority which can be used to determine prioritizing of client application instances when there are multiple client application instances associated with a single destination. This prioritization could determine the ranked preference of different client application types. The prioritization could determine ranking of client application instances by the device on which they are installed (e.g., ranking a phone higher than a desktop computer). The prioritization could be using in selecting one client application instance but may alternatively be used in selecting multiple client application instances to update. In many instances, the sending of a message using IP-based communications is used in updating a messaging service that is synced to various client application instances and so distribution across multiple client application instances may be managed by the operator of the client application.

Block S130, which includes retrieving client status of the destination endpoint from the client application registry system, functions to search for client status regarding one or more destination endpoints associated with the messaging request. Retrieving a client status can involve querying or inspecting the client application registration system. Results of a present or lack of client application association can be represented by a client status. Client status can indicate if a client application is mapped to a destination endpoint. The client status may additionally provide other data of other aspects relating to the client application such as the IP-based communication endpoint, usage, and/or other information on communicating with the client application. The retrieval of client status can result in the finding of one or more records indicating the client status of one or more destination endpoints. The retrieval of client status may in some events result in no results, which would implicitly indicate a client status where IP-messaging is not an option and carrier-based communication will be used as in process S151.

The manner of retrieving client status will vary depending on the architecture in which the client application registry system is maintained.

In one variation, a client application registry system can be hosted externally. Accordingly, retrieving client status can include sending a request to an external client application registry system and receiving a response indicating client-status of the endpoint. The client status may be implicitly implied in the event that no application instance has been registered or may be explicitly supplied by stating information regarding a client application instance associated with a communication endpoint.

In exemplary variation of using an external service, client status may be determined by actively attempting to communicate with an implied IP-based communication endpoint based on the destination endpoint. For example, an IP messaging service may enable a URI endpoint that is based on a phone number to be queried to determine if messaging is enabled and/or allowed.

In some variations, there may be a plurality of external client application registries. In such a scenario, multiple requests may be sent out to query multiple databases for client status information. Accordingly, retrieving the client status of the destination endpoint from the client application registry system may include querying multiple client application registries of the client application registry system.

In some variations, an internal client application registry may also be maintained based on collected information from an external registry and so these variations with an external client application registry may additionally include updating an internal client application registry with determined client status information. This may serve a short-term cache for the client status of previously inspected communication endpoints.

In some variations, a single internally maintained registry may be maintained. Accordingly, retrieving client status can alternatively include querying an internally maintained client application registry system, which functions to access and inspect an internally maintained client application registry.

Block S140, which includes determining a messaging protocol option based on the client status, functions to select how a message is sent to a destination. The selection may occur between a carrier-based communication option and an IP-based communication option. In some instances, there may be multiple messaging protocol options. Additionally, block S140, may determine other factors for how a message is transmitted. In the case of IP-based communication, determining a messaging protocol option may further include determining a client application as a destination, which may involve selecting between multiple client application types and/or selecting particular instances (e.g., a client application instance on a phone or in a browser of a desktop computer).

Determining a messaging protocol option uses the client status. The client status may indicate if a client application is mapped to the destination. In some variations, determining a messaging protocol option is based directly on the results of retrieving the client status in block S130. In some variations, the client status is analyzed. In such variations, determining the messaging protocol option includes evaluating the client status for use of a client application destination S141.

Block S141, which includes evaluating the client status for use of a client application destination, functions to make a determination of if a client application instance and its associated properties meet a condition for IP-based communication. In some variations, the evaluation may be directly made based on the retrieved client status in S130 as mentioned above. However, in some variations, a determination may be made as to whether a client application instance qualifies as an active client application instance. This determination may be made based on usage history. The evaluation may additionally assess prioritization of different messaging options to select a suitable messaging protocol option. In one such variation evaluating the client status for use of the client application destination can include detecting client application registration and inspecting time-based activity of client application destination. This functions to initially confirm if a client application reachable using IP-based communication channel is associated with the destination endpoint and then evaluating time-based activity to see if client status is classified as active or inactive.

In one variation, evaluating the client status for use of a client application destination may be made by determining if the last reported use is within a qualifying time window. For example, IP-based communication may be used if reported use of the client application was made within the last 24 hours (or any suitable time period).

In another variation, evaluating the client status for use of a client application destination may be made by analyzing a timeline of reported client application events and determining if a client application is active. This may use various machine learning, heuristical/rule-based assessments, or other approaches for classifying the status of a client application. This evaluation could calculate or otherwise use the frequency of usage and/or the change in usage. For example, a client application that has a long history of periodic use may be determined to be active despite not having been used in many days or even weeks. In a contrasting example, if the history of a client application instance suddenly changes where there is a sudden stopping of use, then that may be an indicator of non-active use.

Evaluating the client status could additionally prioritize and select an appropriate messaging protocol option. This may be used if there are multiple IP-based communication endpoints and/or client application instances mapped to a destination endpoint. Evaluating the client status may select one or more different client applications as targeted recipients of the message. In one exemplary variation, if a user has multiple messaging applications installed that are all mapped to their phone number, then the one most commonly used may be selected for IP-based communication. Alternatively, all of the different messaging applications may be selected for IP-based communication.

The messaging protocol option and optionally the resulting evaluation of the client status may be used in transmitting a message in process block S150. In one variation, a resulting evaluation of the client status can be used such that then the communication service then can facilitate relaying the message using one of transmitting content of the messaging request to the destination endpoint using carrier-based communication channel as in block S151 or transmitting content of the messaging request to the client application instance using an IP-based communication channel as in block S152. When the messaging request is a message to be delivered to multiple destination endpoint, then each endpoint may be treated in an individually appropriate manner. In some cases, various rules may be set so that the transmitting of a message is dependent on if IP-based messaging is available or if carrier-based messaging is available.

Block S150, which includes transmitting a message using the determined messaging protocol option, functions to send one or more message using one of a carrier-based communication channel or an IP-based communication channel.

Using a carrier-based communication channel can include sending or initiating an SMS, MMS, or other type of carrier-based message. A messaging attempt using a carrier-based communication channel can be sent through a carrier network. In the case where the communication service interfaces with one or more carrier networks, SMPP may be used to communicate with one or more carrier messaging routes or gateways. The carrier-based communication channel may use a telephone endpoint (e.g., a phone number) as the recipient endpoint.

Using an IP-based communication channel can include sending a message using IP network communication. In some variations, HTTP-based communication is used in delivering a message to a client application. IP-based communication channel is one that does not use SMS or MMS messaging protocol. In some instances, an IP network traffic may use cellular data connection but using an IP communication protocol as opposed to a messaging protocol built into the cellular network. Messaging using IP-based communication channel may use a variety of ways of delivering a message one or more client applications. In some variations, messages sent through an IP-based communication channel are delivered directly to the client application. In other variations, messages sent through an IP-based communication channel update message status within a messaging application hosted in some internet accessible messaging service, and the client application updates its message state through a connection with the messaging service. An IP-based communication endpoint may be used in addressing the message. In some variations, the IP-based communication endpoint may be the destination endpoint or incorporate the destination endpoint. For example, the phone number may be used as an identifier of the client application.

In some variations, the use of IP-based communication channel is used as a primary option when available and when satisfying certain conditions (e.g., when the client status evaluation indicates active usage), and then carrier-based communication is used when use of the IP-based communication channel is not available or otherwise not suitable.

In one variation, IP-based communication may be used as the determined messaging protocol option for an initial attempt when IP-based communication is available, and then the message can be reattempted if not confirmed as being delivered/read. This option may be used when a client application supports read or delivery receipts for IP-based communications. Transmitting the message using the determined messaging protocol option can include transmitting the message using IP-based communication channel when the client status indicates an associated client application, and then reattempting transmitting the message using a carrier-based communication channel based on read and/or delivery feedback. Reattempting transmitting the message using a carrier-based communication based on read and/or delivery feedback can include: receiving read or delivery confirmation from the client application, which concludes transmitting of the message; and satisfying a condition indicating read and/or delivery confirmation failure, and in response transmitting the message using a carrier-based communication channel.

As discussed, transmitting the message using the determined messaging protocol option S150 may include: in response to the destination endpoint having an inactive client status, transmitting content of the messaging request to the destination endpoint S151; and in response to the destination endpoint having an active client status, transmitting content of the messaging request to a client application endpoint mapped to the destination point S152.

Block S151, which includes transmitting content of the messaging request to the destination endpoint in response to the destination endpoint having an inactive client status, functions to use a carrier-based communication to deliver a message. A client status that indicates an inactive client application may describe a destination endpoint that has no record in the client application registry system. An inactive client status may additionally include the condition where a client application is identified as being mapped to the destination endpoint, but the client application instance is considered inactive for some additional reason. As one reason for a client application to be inactive is that the usage history satisfies some condition for inactivity such as not using the client application within some time window or where a pattern of previous usage indicates that the client application is inactive. The activity/inactivity condition may be a heuristical model using a set of predefined conditions, using a machine learning model to analyze various input data, and/or using any suitable approach. Sending a message using carrier-based communication can transmit the message using a SMS/MMS/RCS carrier route of the communication service. In another variation, the message may be relayed to another external communication service (e.g., using an API) that then facilitates transmission of the SMS/MMS/RCS message.

Block S152, which includes transmitting content of the messaging request to a client application endpoint mapped to the destination point in response to the destination endpoint having an active client status, functions to use IP-based communication to deliver a message. An active client status at least indicates an associated mapping to one client application endpoint. An active client status may additionally be conditional on if the client application was recently used. Sending an IP-based communication may be performed in a variety of IP-based messaging approaches.

In one variation, IP-based addressing information is collected as part of the client status, and a message may be transmitted to an indicated address of the client application instance.

In another variation, a message may be relayed to the operator of the client application, which then facilitates relaying to the appropriate client application instance.

In the case where different IP-based messaging services are supported by different types of client applications, then the method may include selecting an appropriate messaging service and sending the message to the client application instance through the selected messaging service (e.g., during S140 and/or S152). For example, if the method is performed in coordination with multiple different phone providers, then each phone provider may maintain their own messaging service used to relay communications to the client applications.

As mentioned herein, use of IP-based messaging may enable various features and capabilities beyond standard SMS/MMS/RCS. The messages may be transformed or modified for these feature capabilities, and the client application may execute and appropriately render those features within the messaging user interface such as formatting content, rendering call to action UI elements, displaying caller ID logos, collecting delivery/read receipts. Furthermore, once a message is delivered, the client application instance may further update registration if activity is detected.

In some variations, the method may include confirming delivery, reading, and/or other interactions with a message at an application instance. Additionally, method variations may include retrying transmitting of a message if delivery and/or reading of a message is not confirmed. In other words, process S151 may be attempted if after process S152 there is no satisfactory confirmation from the client application instance.

Figure 9:
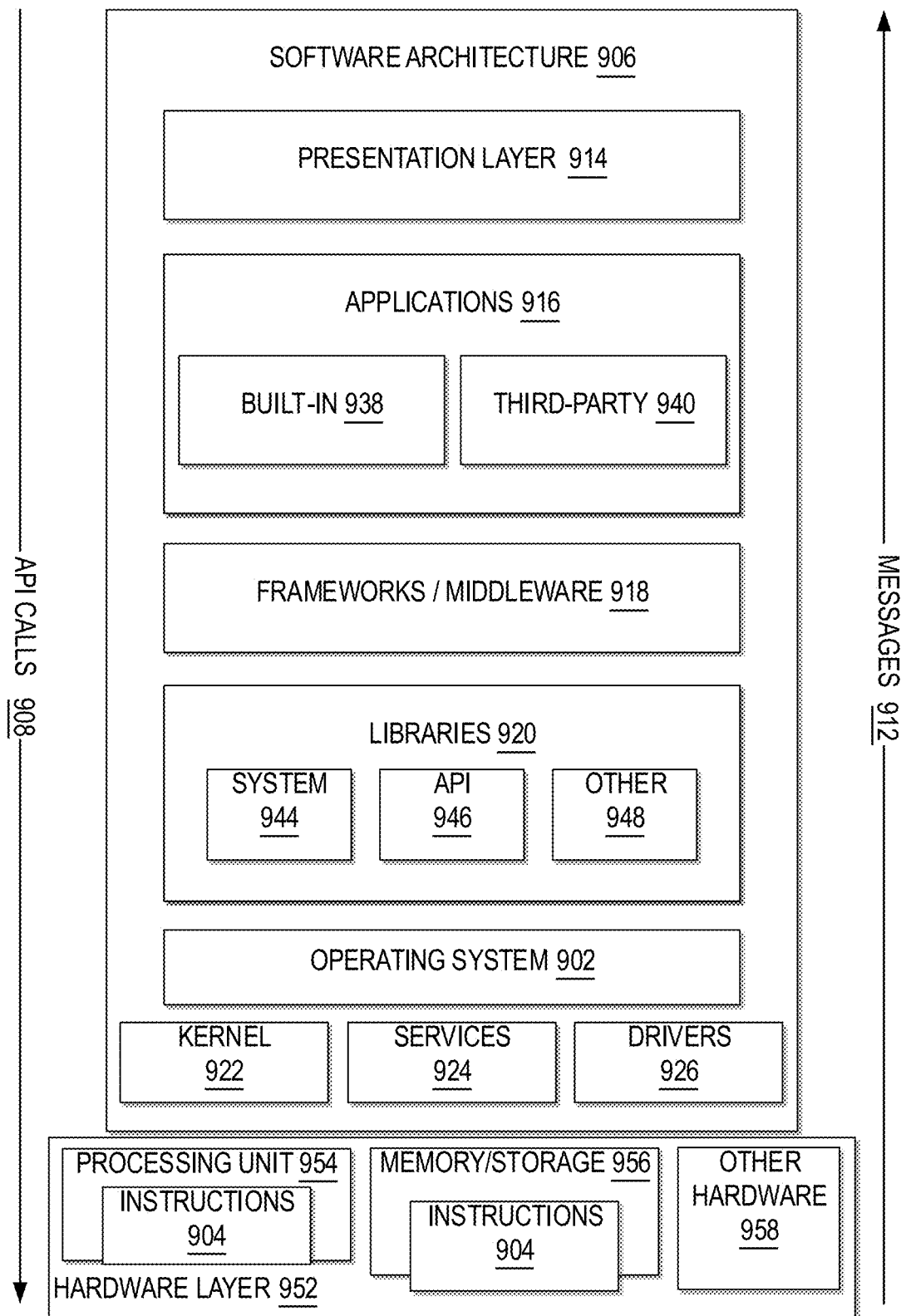
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating an example software architecture 906, which may be used in conjunction with various hardware architectures herein described. FIG. 9 is a non-limiting example of a software architecture 906 and it will be appreciated that many other architectures may be implemented to facilitate the functionality described herein. The software architecture 906 may execute on hardware such as machine 1000 of FIG. 10 that includes, among other things, processors 1004, memory 1014, and (input/output) I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
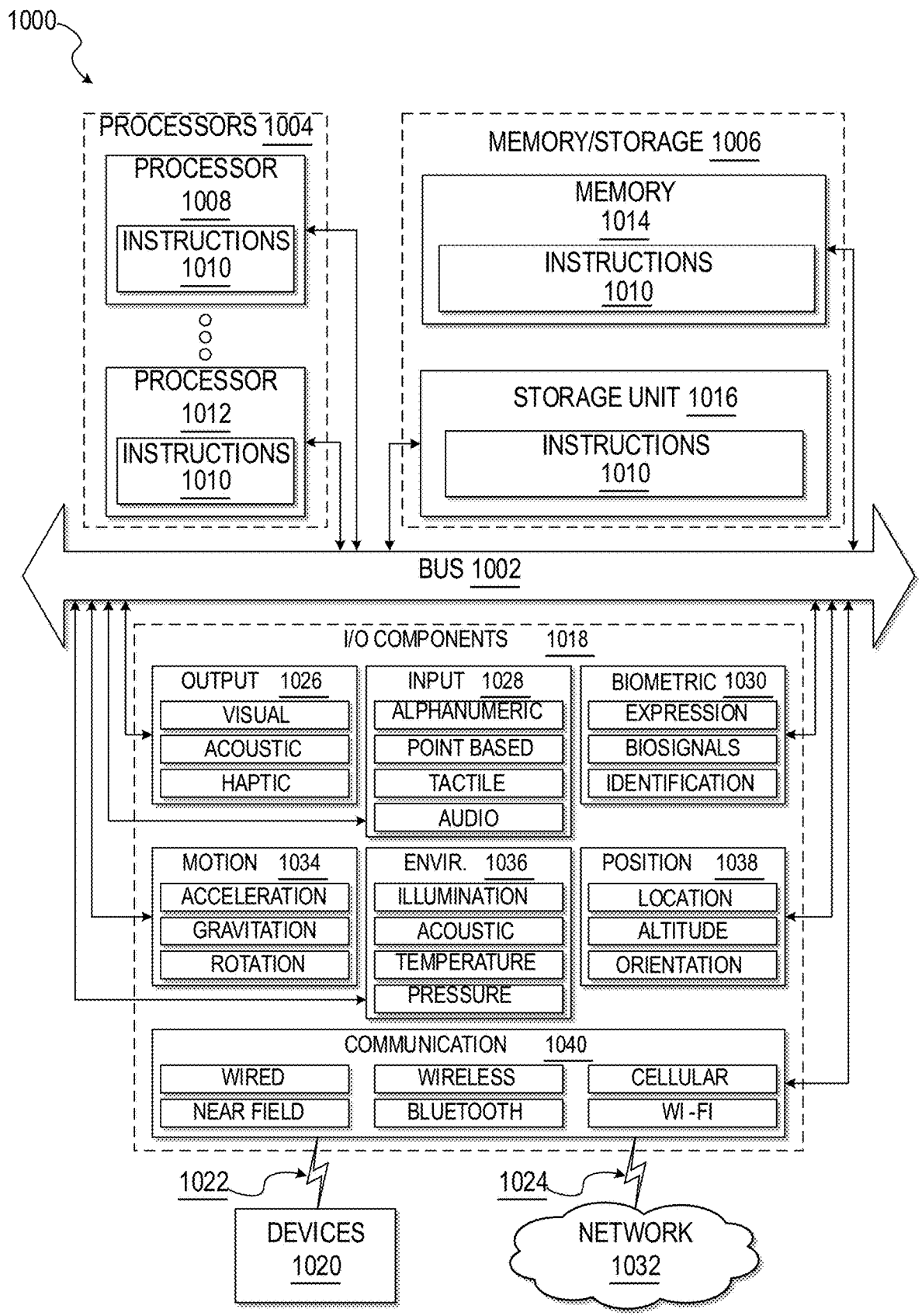
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or software logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

What is claimed is:
1. A method comprising:
receiving a messaging request specifying a destination endpoint for a message;
retrieving client status of the destination endpoint from a client application registry system, the client status comprising an identifier of a client application registered for reaching the destination endpoint;
evaluating the client status of the destination endpoint for use of the client application; and
depending on whether the client status is being active or inactive, transmitting the message either to the destination endpoint or the client application associated with the destination endpoint.

2. The method of claim 1, wherein the client status comprises an identifier of the client application.

3. The method of claim 1, wherein the client application is registered to receive a plurality of messages from a plurality of senders at the destination endpoint.

4. The method of claim 3, further comprising:
selecting, from one or more carrier-based communication options and one or more IP-based communication options, a messaging protocol option based on the client application registered to receive the plurality of messages from the plurality of senders at the destination endpoint.

5. The method of claim 4, wherein:
the client status indicates time-based activity of the client application; and
selecting the messaging protocol option comprises detecting client application registration and inspecting the time-based activity of the client application.

6. The method of claim 1, wherein transmitting the message comprises:
in response to the destination endpoint having an inactive client status, transmitting content of the messaging request to the destination endpoint; or
in response to the destination endpoint having an active client status, transmitting the content of the messaging request to the client application associated with the destination endpoint.

7. The method of claim 1, wherein retrieving the client status of the destination endpoint from the client application registry system comprises querying multiple client application registries of the client application registry system.

8. The method of claim 1, the client application registry system includes an internally maintained client application registry.

9. The method of claim 1, further comprising receiving client application registration update and updating the client application registry system.

10. The method of claim 1, wherein the messaging request is received via an application programming interface.

11. A system comprising:
a memory; and
at least one computer processor coupled to the memory to perform operations comprising:
receiving a messaging request specifying a destination endpoint for a message;
retrieving client status of the destination endpoint from a client application registry system, the client status comprising an identifier of a client application registered for reaching the destination endpoint;
evaluating the client status of the destination endpoint for use of the client application; and
depending on whether the client status is being active or inactive, transmitting the message either to the destination endpoint or the client application associated with the destination endpoint.

12. The system of claim 11, the operations further comprising:

selecting, from one or more carrier-based communication options and one or more IP-based communication options, a messaging protocol option based on the client application registered to receive a plurality of messages from a plurality of senders at the destination endpoint.

13. The system of claim 12, wherein:

the client status indicates time-based activity of the client application; and selecting the messaging protocol option comprises detecting client application registration and inspecting the time-based activity of the client application.

14. The system of claim 11, wherein transmitting the message comprises:

in response to the destination endpoint having an inactive client status, transmitting content of the messaging request to the destination endpoint; or in response to the destination endpoint having an active client status, transmitting the content of the messaging request to the client application associated with the destination endpoint.

15. A non-transitory computer-readable medium storing instructions that, when executed by one or more computer processors of one or more computing devices, cause the one or more computing devices to perform operations comprising:

receiving a messaging request specifying a destination endpoint for a message;

retrieving client status of the destination endpoint from a client application registry system, the client status comprising an identifier of a client application registered for reaching the destination endpoint;

evaluating the client status of the destination endpoint for use of the client application; and depending on whether the client status is being active or inactive, transmitting the message either to the destination endpoint or the client application associated with the destination endpoint.

16. The non-transitory computer-readable medium of claim 15, the operations further comprising:

selecting, from one or more carrier-based communication options and one or more IP-based communication options, a messaging protocol option based on the client application registered to receive a plurality of messages from a plurality of senders at the destination endpoint.

17. The non-transitory computer-readable medium of claim 16, wherein:

the client status indicates time-based activity of the client application; and selecting the messaging protocol option comprises detecting client application registration and inspecting the time-based activity of the client application.

18. The non-transitory computer-readable medium of claim 15, wherein transmitting the message comprises:

in response to the destination endpoint having an inactive client status, transmitting content of the messaging request to the destination endpoint; or in response to the destination endpoint having an active client status, transmitting the content of the messaging request to the client application associated with the destination endpoint.

19. The non-transitory computer-readable medium of claim 15, wherein retrieving the client status of the destination endpoint from the client application registry system comprises querying multiple client application registries of the client application registry system.

20. The non-transitory computer-readable medium of claim 15, the client application registry system includes an internally maintained client application registry.

* * * * *